United States Patent
Smith

(10) Patent No.: US 9,953,310 B2
(45) Date of Patent: Apr. 24, 2018

(54) SYSTEMS AND METHOD FOR PROVIDING MULTIPLE VIRTUAL SECURE ELEMENTS IN A SINGLE PHYSICAL SECURE ELEMENT OF A MOBILE DEVICE

(71) Applicant: MasterCard International Incorporated, Purchase, NY (US)

(72) Inventor: Theresa L. Smith, St. Albans Hearts (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1444 days.

(21) Appl. No.: 13/796,503

(22) Filed: Mar. 12, 2013

(65) Prior Publication Data

US 2013/0304651 A1    Nov. 14, 2013

Related U.S. Application Data

(60) Provisional application No. 61/645,472, filed on May 10, 2012.

(51) Int. Cl.
*G06Q 20/00* (2012.01)
*G06Q 20/32* (2012.01)
(Continued)

(52) U.S. Cl.
CPC ..... *G06Q 20/3227* (2013.01); *G06Q 20/3229* (2013.01); *G06Q 20/3821* (2013.01);
(Continued)

(58) Field of Classification Search
None
See application file for complete search history.

(56) References Cited

U.S. PATENT DOCUMENTS 8,645,699 B2 * 2/2014 Wood ............... H04L 9/3263
380/30
2003/0236983 A1   12/2003 Mihm, Jr.
(Continued)

OTHER PUBLICATIONS

Notification of Transmittal of the International Search Report (Forms PCT/IB/220 and PCT/IB/210) and the Written Opinion of International Searching Authority (Form PCT/ISA/237) dated Aug. 21, 2013, by the International Bureau of WIPO in International Application No. PCT/US2013/040251. (11 pages).

*Primary Examiner* — John Hayes
*Assistant Examiner* — John M Winter
(74) *Attorney, Agent, or Firm* — Buchanan Ingersoll & Rooney PC

(57) ABSTRACT

Methods and systems are disclosed for providing a plurality of virtual secure elements (virtual SEs) to mobile devices with secure elements (SEs). A method generates and forwards a certificate authority security domain (CASD) key for a plurality of virtual SEs to an SE supplier that created the CASD. The method receives a card serial number (CSN) and a card production life cycle (CPLC) key from the SE supplier and forwards these to a mobile device maker. An updated CSN and CPLC data is received from the device maker with an International Mobile Equipment Identity (IMEI) and an issuer security domain key (ISD key) is added to the CSN and CPLC data by a master secure element issuer trusted service manager (master SEI TSM). An application is provisioned to the device that retrieves the CSN, CPLC data, and the IMEI, which are used for to verify and activate the virtual SE.

15 Claims, 6 Drawing Sheets

}

(51) Int. Cl.
*G06Q 20/38* (2012.01)
*H04W 4/00* (2018.01)
*H04W 12/04* (2009.01)
*H04L 29/06* (2006.01)

(52) U.S. Cl.
CPC ........... *H04W 4/001* (2013.01); *H04W 12/04* (2013.01); *H04L 63/0823* (2013.01)

(56) References Cited

U.S. PATENT DOCUMENTS

| | | |
|---|---|---|
| 2005/0153741 A1 | 7/2005 | Chen et al. |
| 2007/0095927 A1* | 5/2007 | Pesonen ................ G07F 7/1008 235/492 |
| 2008/0126145 A1* | 5/2008 | Rackley, III ......... G06Q 20/102 455/406 |
| 2010/0088518 A1* | 4/2010 | Dottax ................. G06Q 20/341 713/175 |
| 2010/0291896 A1 | 11/2010 | Corda |
| 2010/0306076 A1 | 12/2010 | Taveau et al. |

\* cited by examiner

SYSTEMS AND METHOD FOR PROVIDING MULTIPLE VIRTUAL SECURE ELEMENTS IN A SINGLE PHYSICAL SECURE ELEMENT OF A MOBILE DEVICE

RELATED APPLICATION

This application claims the priority benefit of commonly assigned U.S. Provisional Application No. 61/645,472, filed May 10, 2012, for "Systems and Methods for Providing Multiple Virtual Secure Elements in a Single Physical Secure Element of a Mobile Device," by Theresa L. Smith, which is herein incorporated by reference in its entirety.

FIELD

The present disclosure is directed to a method and system providing technical solutions for providing multiple virtual secure elements (virtual SEs) in a single physical secure element (SE) of a mobile device and using the virtual SEs to enable use of multiple payment accounts for electronic payments from the mobile device using in part a financial transaction card processing system or network as a part thereof.

BACKGROUND

Advances in mobile and communication technologies have created tremendous opportunities, one of which is providing users of mobile computing devices an ability to initiate payment transactions using their mobile device. One approach to enable mobile devices to conduct payment transactions is through the use of near field communication (NFC) technology to securely transmit payment information to a contactless terminal. To enable this, mobile phones with a hardware-implemented secure element (e.g., a secure element chip) can be used to securely store payment account credentials, such as credit card credentials, have been used. Generally only certain authorized applications or services are given access to data in the secure element (SE), and there are multiple levels of protection for data stored on the secure element. In this way the SE is protected at the hardware level from tampering or hacking.

Data stored in traditional storage media such as device memory, subscriber identity/identification modules (SIM cards), secure digital (SD) cards, and universal serial bus (USB) tokens/flash memory drives installed in or connected to mobile devices can be encrypted or otherwise secured. However, unlike an SE, which is embedded in and tied to a specific mobile device, other storage media can be transferred from one mobile device to another device. As a result, the security levels afforded by using such storage media may not be sufficient to securely store payment account credentials or otherwise support payment transactions.

To resolve these issues, mobile devices configured to operate with a PayPass® chip have been proposed. However, users of mobile phones often have multiple payment accounts. Additionally, not all issuers, acquirers or merchants have host systems that can process chip data elements from certain hardware chips. As a result, a user who has an NFC-capable mobile device may not be able to use it as a payment device if their mobile device's secure element (SE) hardware chip is not compatible with a payment processing system or merchant terminal. Also, ownership of these hardware SEs can be a contentious obstacle to mass commercialization of NFC payment technology. For example, some SE chips are owned by mobile network operators (MNOs) or telecommunications companies (telcos), others by mobile phone handset makers, and still others may be owned by banks or financial institutions. Further complicating existing systems is the fact that some MNOs and telcos favor SIM modules as opposed to embedded SEs in mobile phones on their network.

Accordingly, what is needed are systems and methods that use an open scheme which enables allocation of multiple virtual SEs in the same physical chip of a mobile phone.

On a different note, some existing smart card services are offered via the GlobalPlatform (GP), wherein the service offerings adhere to GP specifications and standards. GP is a cross industry, not-for-profit association which identifies, develops and publishes specifications which facilitate the secure and interoperable deployment and management of multiple embedded applications on secure chip technology.

In the context of the GP platform and specifications, the term 'secure chip' refers to embedded technologies used in various hardware elements and chips, such as, but not limited to, smart cards, application processors, SD cards, USB tokens and secure elements (hardware SEs) for protecting assets (data, keys and applications) from physical or software attacks.

Traditional mobile payment systems require complex interactions with SE suppliers/providers, handset makers, and trusted service managers (TSMs) of multiple mobile network operators (MNOs) in order to generate keys and complete transactions.

Accordingly, what is further needed are systems and methods that provide technical solutions that provide multiple virtual SEs in a single hardware SE resident in a mobile device without significantly increasing the complexity of mobile payment systems.

Processing contactless and mobile payments using traditional payment accounts often requires multiple phone-based electronic wallets capable of providing authenticated transactions across multiple channels of commerce to be installed on a mobile device. These multiple electronic wallets may in turn require separate, local, secure (i.e., encrypted) storage on the mobile device (i.e., in a SIM card or SE chip on the device. Besides the complexities and burdens inherent in provisioning, activating and maintaining multiple, often divergent electronic wallets on mobile devices, the fact that such devices typically only contain a single secure storage device (i.e., one SIM card or SE chip) may prevent users from using multiple payment accounts to make mobile payments.

Accordingly, what is further needed are systems and methods that allow mobile devices with a single hardware SE chip to use multiple, virtual SEs within the hardware SE to complete mobile payments using one or more existing payment accounts, such as, but not limited to, a PayPass® account, so that the user can conduct PayPass® transactions at PayPass®-enabled merchants with a mobile device without having to use an SE and without requiring their acquirer or merchant to make significant changes to their host system(s).

SUMMARY

Methods and systems are disclosed for providing multiple virtual SEs within a single hardware SE of a NFC-enabled mobile device. In an embodiment, the virtual SEs can be associated with a plurality of different issuer real card accounts (RCAs) for instance or other accounts that need to be secured, which can be dynamically selected from within a wallet application on a mobile device, such as a smartphone. In an embodiment, because the virtual SEs are stored in a single hardware SE chip and a service manages key exchange for the virtual SEs and other security infrastructure requirements, each virtual SE has a security level comparable or equal to that achieved when using the hardware SE that the virtual SE is installed in. The virtual SEs can be conceptualized as separate, secure partitions of the hardware SE. As with the hardware SE that the virtual SEs are provisioned to (i.e., installed in), only certain authorized applications or services are given access to data in the virtual SEs, and there are multiple levels of protection for data stored in the respective virtual SEs. According to embodiments, access to each virtual SE is restricted to authorized services and programs (i.e., applications) from certain service providers, service offerors, financial institutions, and other approved entities. In one embodiment, this access to the virtual SEs can be controlled through a service that provides key exchange and a service subscription model and managed by a trusted service manager (TSM).

In one embodiment, an open, free, and global scheme includes offering a new service using the existing GlobalPlatform (GP). In this embodiment, the global scheme and the new service adhere to the GP specifications and standards and a payment processor acts as a trusted third party to manage virtual SEs on behalf of financial institutions (e.g., banks), other card issuers and other parties.

According to one embodiment using the GP, a payment processor, such as, but not limited to, MasterCard, functions as a service provider within the GP and exchanges keys with an SE supplier that is authorized for such key exchange, such as, but not limited to, NXP Semiconductors. According to this embodiment, the payment processor is able to have control of the process for provisioning or creating multiple virtual SEs on a mobile device such as a smart phone. In this embodiment, the payment processor can divulge a set of keys on behalf of a given bank or financial institution issuing a card (i.e., an issuer), such as, but not limited to, Citibank, so that one virtual SE can be provisioned to a mobile device for that issuer. By repeating this key exchange via the service for other issuers, multiple virtual SEs can be provisioned to a mobile device having a single hardware SE. According to this embodiment, the role of the payment processor is that of a virtual SE manager that functions as a central service within the GP. In this way, the payment processor is a trusted service provider and trusted service manager (TSM) for virtual SEs. This TSM can be embodied as a master secure element issuer TSM (master SEI TSM) that manages information related to virtual SEs so that multiple virtual SEs can be provisioned to mobile devices having a single hardware SE. In one embodiment the master SEI TSM is a global TSM hosted by MasterCard (i.e., an 'MC master SEI TSM'). It should be noted that the TSM does not have to be a payment processor, or for that matter involved in processing financial transactions, but rather can be an entity that services any industry or entity that might need access to one or more SEs on a mobile device.

As the GP includes delegated management (DM) functionality, any qualified party can have a virtual SE. This embodiment benefits SE suppliers, manufacturers, and providers, such as, but not limited to, NXP Semiconductors, because it employs a sophisticated and high capacity embedded SE chip such as those manufactured by SE suppliers.

In another embodiment, a technical solution includes pre-loading of Mobile PayPass® in read only memory (ROM) in a mobile device and pre-allocation of a virtual SE to a payment processor, such as, but not limited to, MasterCard.

In other embodiments, a method and system provides technical solutions to allow mobile devices to be configured with multiple, virtual SEs which can in turn be associated with one or more existing payment accounts, such as, but not limited to, a PayPass® account, so that the user can conduct PayPass® transactions at PayPass®-enabled merchants using a mobile device with a single hardware SE.

In yet another embodiment, a global TSM scheme includes a global TSM hub that acts a liaison or broker to exchange keys and information between mobile handset makers, SE suppliers/makers, applet providers, service providers, service offerors, and users associated with mobile handsets/devices.

Figure 1:
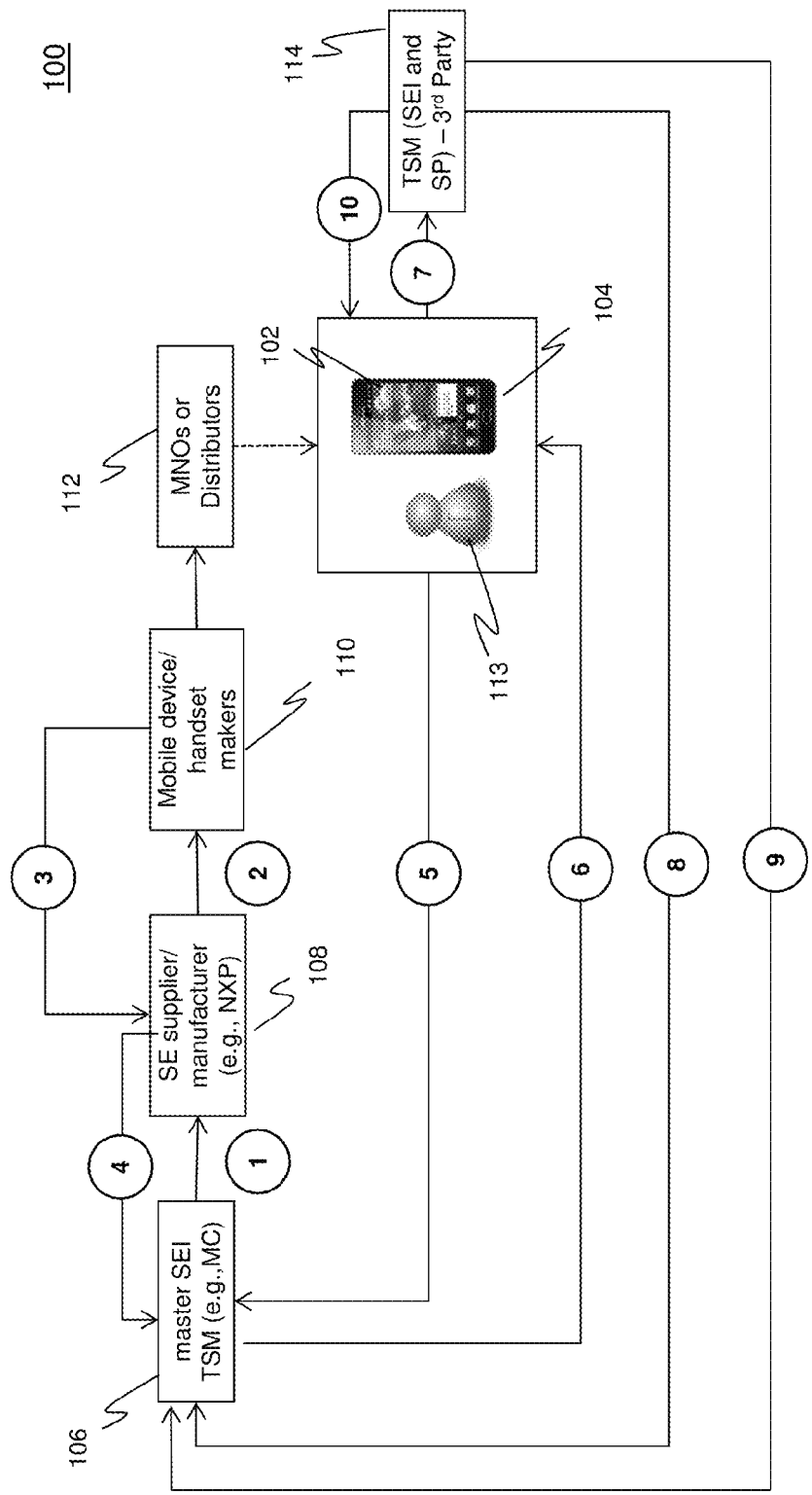
FIG. 1 is a flow diagram illustrating steps by which multiple virtual SEs can be generated and provisioned to a mobile computing device having a single SE, in accordance with an exemplary embodiment of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number. For brevity, only the differences occurring within the figures, as compared to previous or subsequent ones of the figures, are described below.

DETAILED DESCRIPTION

As used herein, "payment account", "real card account", "credit card number" and "credit card" are sometimes used interchangeably. These terms mean a credit card, debit card, pre-paid card, hybrid card, plastic or virtual card number (VCN), or nearly any other account number that facilitates a financial transaction using a transaction clearance system. VCNs and pre-paid card numbers and other financial transaction card number that can be generally viewed as being more readily issued and disposed of because they do not require the establishment of a line of credit, and can be linked to various controls (amounts, cumulative amounts, duration, controls on spending by amounts, cumulative amounts, types of merchants, geographic controls, to name a few). As used herein, these types of cards (VCN, pre-paid, etc.) are referred to as intelligent transaction card (ITC) numbers. As used herein, the term "payment account" is sometimes used interchangeably with a payment account number and means a credit card, the account number for a credit card, or any identifier that can be used to link a payment account to a purchase transaction initiated from a mobile device.

At the onset, it is noted that, as used herein, the terms "user", "customer", "consumer", "cardholder", "card user", and "card recipient" can be used interchangeably and can include any user making purchases of goods and/or services. Unless specifically stated differently, in an embodiment, a user is interchangeably used herein to identify a human customer, a software application, or a group of customers and/or software applications executed by one or more consumers to conduct a purchase transaction. Besides a human customer who can purchase items using a mobile device, a software application can be used to process purchases. Accordingly, unless specifically stated, the terms "customer", "consumer", "cardholder", "card user", "user", and "card recipient" as used herein do not necessarily pertain to a human being.

Figure 2:
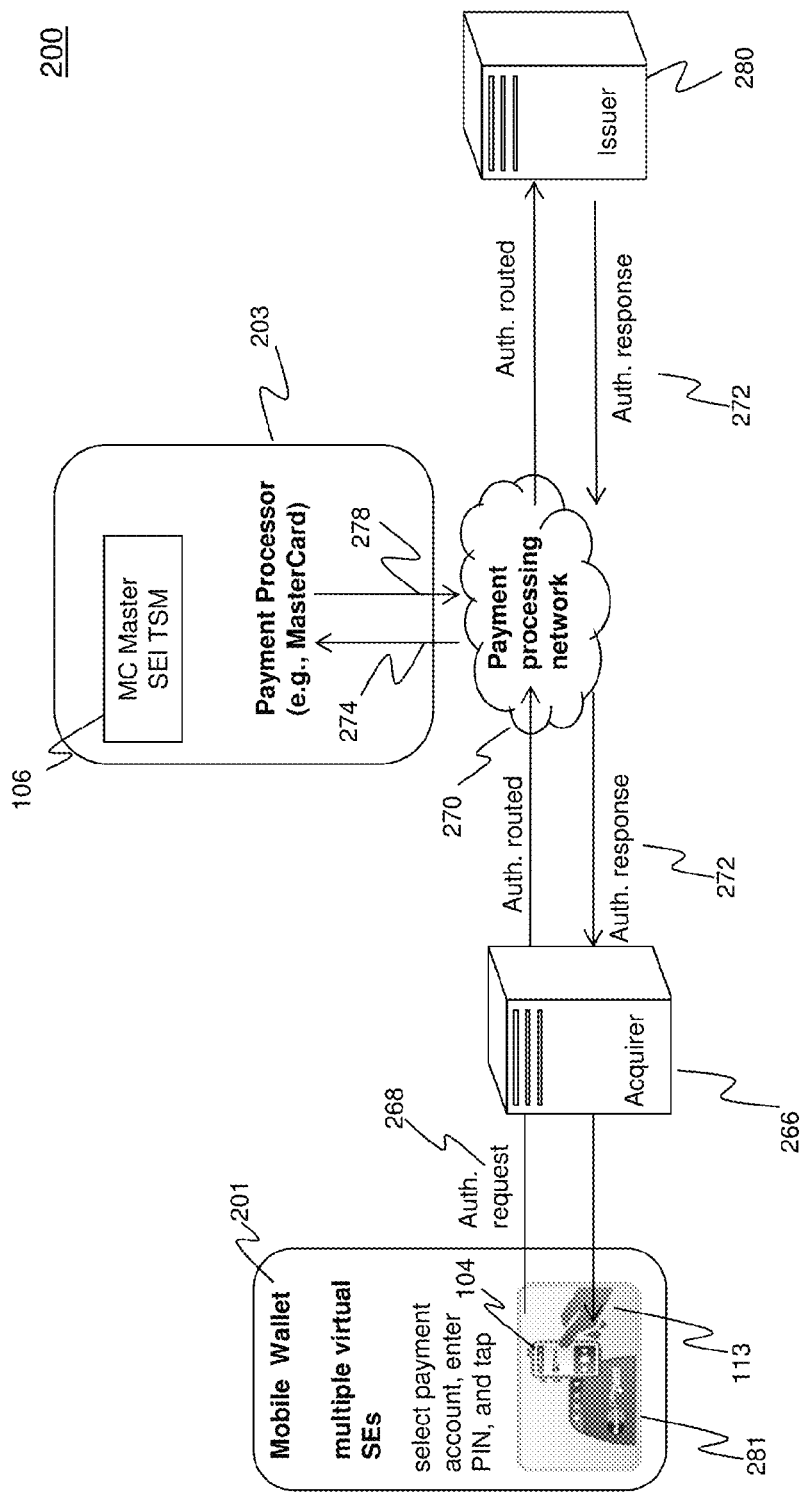
FIG. 2 is a diagram of an exemplary system in which multiple virtual secure elements (virtual SEs) can be provided in a single secure element chip (SE), in accordance with an exemplary embodiment of the present disclosure.

Further, as used herein, the term "issuer" can include, for example, a financial institution (e.g., bank) issuing a card, a merchant issuing a merchant specific card, a stand-in processor configured to act on-behalf of the card-issuer, or any other suitable institution configured to issue a financial card. Examples of such financial institutions are depicted in FIGS. 2 (i.e., issuer 280) and 4 (i.e., financial institution/issuer 480). Finally, as used herein, the term "transaction acquirer" can include, for example, a merchant, a merchant terminal, a point-of-sale (POS) terminal at a merchant, or any other suitable institution or device configured to initiate a financial transaction per the request of a customer.

Examples of systems and methods for routing electronic transactions through financial processing systems (e.g., debit/credit networks) as a part of an electronic payment system are described in U.S. application Ser. No. 13/078, 374, entitled "Method for Performing Acquirer Routing and Priority Routing of Transactions," filed on Apr. 1, 2011, which is incorporated herein by reference in its entirety.

I. METHOD EMBODIMENTS

FIG. 1 is a flow diagram illustrating steps by which multiple virtual SEs can be generated and provisioned to a mobile computing device having a single SE using a method 100. As shown in FIG. 1, method 100 can be implemented in an environment comprising a user 113 associated with a mobile device 104 having a graphical user interface (GUI) 102, a master SEI TSM 106, a hardware SE supplier, supplier or maker 108 (e.g., NXP Semiconductors in the example of FIG. 1), one or more mobile device/handset makers 110, mobile network operators (MNOs) or distributors 112, and a third party TSM 114 (i.e., a TSM from a secure element issuer (SEI) or a service provider SP in the example of FIG. 1). In embodiments, mobile device/handset makers 110 can include manufacturers and suppliers of mobile phones and mobile computing devices such as, but not limited to, Samsung Electronics, Motorola, Research in Motion (RIM), Nokia, ZTE, LG, Sony Ericsson/Sony Mobile Communications AB, Qualcomm Inc., NEC, HTC Corporation, and Apple.

According to embodiments, the MNOs 112 can include mobile/wireless cellular telecommunications companies (telcos), wireless service providers, wireless carriers, and mobile network carriers that provide wireless communication services, or that own or control components and elements necessary to sell and deliver mobile data services to the user 113 of mobile device 104. It is to be understood that an MNO 112 can own or control radio spectrum allocation, wireless network infrastructure, back haul infrastructure, billing, provisioning computer systems, and provisioning and maintenance repair capabilities/components. Non-limiting examples of such MNOs 112 include, but are not limited to, Verizon Wireless, Sprint, AT&T Mobility, Vodafone, and T-Mobile.

According to embodiments, SEI TSMs 106 or third party TSMs 114 may be implemented using a TSM from CASSIS International, for example, which can be used to securely provision payment and other secure element applications over-the-air onto the mobile device 104 and manage them over time.

In one embodiment, a Mobile Over-the-Air Provisioning Service is integrated with TSMs 106 and 114 and is implemented using MasterCard's Mobile Over-the-Air Provisioning Service (MOTAPS) so that handset personalization process that transfers the user's 113 card details to their mobile device 104, enabling it for use at a MasterCard PayPass® terminal. According to this embodiment, the MasterCard Mobile™ Over-the-Air Provisioning Service (MOTAPS) provides a secure method for issuers (see issuer 280 depicted in FIG. 2) to extend their PayPass® product portfolios by securely transferring the user's 113 payment account information, via a MNO 112, into the user's 113 NFC-enabled mobile device 104. The user 113 (i.e., cardholder) is then able to use the mobile device 104 as a standalone PayPass® device. The MasterCard MOTAPS platform provides native full TSM features to help issuers 280 streamline provisioning and personalization and life cycle management (see, e.g., lifecycle management 318 depicted in FIG. 3) of Mobile PayPass® enabled mobile devices 104.

MOTAPS is capable of deploying proximity payment over-the-air, but also provides full integration to other services such as a Post Issuance Management Service (PIMS), account management (e.g., primary account number/PAN management, prepaid processing), key management services (e.g. CVC3 validation), and mobile device GUI 102 administration. These are but a few of the services described below with reference to FIG. 3 and depicted in FIG. 3 as security and compatibility management 316 services, lifecycle and memory management 318 services, and application management 320 services.

One non-limiting, exemplary embodiment of a MOTAPS is described in the "MasterCard Mobile Over-the-Air Provisioning Service Product Guide," dated Jan. 14, 2011, which is included with U.S. Provisional Application Ser. No. 61/605,588 filed on Mar. 13, 2012 and entitled "Systems and Methods for Mapping a Mobile Cloud Account to a Payment Account," the disclosures of which is hereby incorporated by reference in their entirety.

Some technical assumptions or details regarding the SE supplier 108 and master SEI TSM 106 elements used to carry out some of the steps of method 100 are provided in the following paragraphs. It is to be understood that, in embodiments, the method 100 for provisioning multiple virtual SEs to a mobile device 104 can be carried out using SE suppliers 108 and master SEI TSMs 106 that adhere to all, none, or subsets/sub combinations of the following assumptions. That is, the details listed below for the SE supplier 108 and master SEI TSM 106 elements can all be combined together in an exemplary, non-limiting implementation of the method 100. However, in alternative embodiments, sub combinations and subsets of the details listed below are enforced for the SE supplier 108 and/or the master SEI TSM 106. Lastly, the method 100 can be carried out using an SE supplier 108 and a master SEI TSM 106 that do not adhere to any of the details below.

It would be preferable that the hardware SEs manufactured, supplied, or otherwise issued by the SE supplier 108, are compliant to specifications of a global payment processing platform. In one embodiment described herein, the hardware SEs are in compliance with the GlobalPlatform (GP) specifications.

According to another embodiment, the hardware SE contains a mobile PayPass® cardlet in read only memory (ROM). In yet another embodiment, the SE supplier 108 is able to create a Certificate Authority Security Domain (CASD) in the hardware SE it manufactures/supplies/issues and is able to inject CASD Keys into the SE during manufacturing.

In accordance with an exemplary embodiment, a certificate authority (CA) of the payment processor (see payment processor 203 depicted in FIG. 2) generates the CASD keys. In one embodiment, the payment processor 203 is MasterCard and the MasterCard CA generates the CASD keys. As would be understood by persons skilled in the relevant art, a CA is an entity that issues digital certificates. A given digital certificate certifies the ownership of a public key by the named subjects of the certificate, thus allowing other, relying, parties to rely upon digital signatures or assertions made by the private key that corresponds to the public key that is certified. In this model of trust relationships, a CA is a trusted third party that is trusted by both the subject (owner) of the certificate and the party relying upon the certificate. CAs are used in public key infrastructure (PKI) schemes.

According to another embodiment, the master SEI TSM 106 supports industry interfaces (i.e., communication protocols and data exchange interfaces).

The following paragraphs define some of the acronyms appearing in FIG. 1 and Table 1.

AM—Authorized Management. As explained in Table 1 below, in an embodiment, the 3rd Party TSM 114 can request Authorized Management from the master SEI TSM 106 as part of a Request for Provisioning (step 8 of FIG. 1).

DM—Delegated Management. As explained in Table 1 below, in another embodiment, the 3rd Party TSM 114 can request Delegated Management from the master SEI TSM 106 as part of a Request for Provisioning.

CASD key—Certificate Authority Security Domain key. In an embodiment, the SE supplier 108 creates a Certificate Authority Security Domain (CASD) in the hardware SE and a payment processor 203 (e.g., MasterCard) generates the CASD key for that CASD. In this embodiment, the SE supplier is able to coordinate with the payment processor 103 to inject these CASD Keys into the SE during manufacturing.

CPLC—Card Production Life Cycle. In an embodiment, the CPLC is a data object (i.e., a data element or data field) associated with hardware or virtual SE provided by corresponding SE supplier 108 (e.g., NXP in the exemplary embodiment provided in FIG. 1). In one exemplary embodiment, the CPLC for a hardware SE is a 42 byte field provided by NXP. According to an exemplary embodiment, the CPLC can be stored in a file or data store as part of a database or data index.

In an embodiment, the CPLC contains information about the manufacturing/production process for an SE chip like the operating system (OS) used by the SE supplier 108 or the integrated circuit card (ICC) manufacturer for the hardware SE.

CSN—Card Serial Number. According to an exemplary embodiment, the CSN for a hardware SE is provided by the SE supplier 108 (e.g., NXP in the exemplary embodiment provided in FIG. 1). Here, card refers to the hardware, not a payment card. In an exemplary embodiment, a mobile device 104 includes a hardware SE that functions as part of a smart card. The hardware SE contains an integrated chip (IC) with a unique permanent identification (UID) number burned-in during the manufacturing process by an SE supplier 108. In this embodiment, this UID can be used as the CSN and the CSN is not encrypted so that an ISO compliant card reader can read the CSN for that hardware SE.

IMEI—International Mobile Equipment Identity. In an embodiment, an IMEI is a data element or field that uniquely identifies a particular mobile device 104. As would be appreciated by those skilled in the relevant art(s), an IMEI can be implemented as a unique number to identify Global System for Mobile Communications (GSM), Wideband Code Division Multiple Access (W-CDMA), and Integrated Digital Enhanced Network (iDEN) mobile devices 104. For example, the IMEI number can be used by a GSM network of an MNO 112 to identify valid mobile devices 104 and therefore can be used for preventing a compromised or stolen phone from accessing the network of that MNO 112. For example, if a mobile device 104 is compromised or stolen, the user 113 can call his or her MNO 112 and instruct the MNO 112 to 'blacklist' the stolen or compromised mobile device 104 using its IMEI number. The MNO 112 can then render the mobile device 104 useless on that network and sometimes networks operated by other MNOs 112, whether or not the mobile device's 104 SIM card is changed.

The IMEI is used for identifying a particular mobile device 104 and has no permanent or semi-permanent relation to a user 113 associated with the mobile device 104. In this way the IMEI is unlike an International Mobile Subscriber Identity (IMSI) number, which can be stored on a SIM card in one mobile device 104, which can subsequently be transferred to another mobile device 104. For example, when a SIM card of a first mobile device 104 is transferred by a user 113 to a second mobile device 104 that the user 113 wishes to active and use, the IMSI identifying that user 113 can likewise be transferred to the second mobile device 104. However, the respective IMEIs of the first mobile device 104 and the second mobile device 104 will differ.

In one embodiment, the last number (digit) or character of the IMEI is a check digit calculated using the Luhn algorithm. According to this embodiment, the check digit is calculated according to Luhn formula (ISO/IEC 7812) (See GSM 02.16/3GPP 22.016). By using the Luhn formula, the check digit of the IMEI is a function of all other digits in the IMEI. In this embodiment, the IMEI is created in such a manner that it will pass the Luhn check integrity test. The Luhn check integrity test, also known as the "modulus 10" or "mod 10" algorithm, is a checksum formula that can be used to validate a variety of identification numbers, such as the IMEI or credit card numbers for payment accounts and is further described in U.S. Pat. No. 2,950,048, entitled, "Computer for Verifying Numbers," filed on Jan. 6, 1954.

As explained in Table 1 below, in accordance with an embodiment, the IMEI is added to CSN and CPLC data as part of the handset manufacturing (step 3 of FIG. 1) and is and can be forwarded to the SE supplier 108 by the handset maker 110.

The enumerated steps 1-10 denoted in FIG. 1 are explained in Table 1 below.

TABLE 1 information flows for steps of method 100

| Process/step | Activity | Description | Request Flow |
|---|---|---|---|
| 1 | Key Generation | Generate CASD Key for SE supplier (e.g., NXP in the example of FIG. 1) | master SEI TSM 106 -> SE supplier 108 |
| 2 | SE Manufacturing | Create CASD and inject CASD Key Generate CSN and CPLC Key deliver to Handset Makers 110 | SE supplier 108 |
| 3 | Handset Manufacturing | Add IMEI to CSN and CPLC data | Handset Maker 110 -> SE supplier 108 |
| 4 | Selling Handsets/ mobile devices 104 managed by the master SEI TSM 106 | Add issuer security domain (ISD) Key to the data sent by Handset Maker 110 to the master SEI TSM 106 | SE supplier 108 -> MC SEI TSM 106 |
| 5 | SE activation | When a consumer 113 first uses the handset/mobile device 104, a software application that is either already installed on the device 104 or is to be downloaded from an Appstore (e.g., MC) will retrieve the CSN, CPLC and IMEI The retrieved data will be sent to the master SEI TSM 106 for verification and activate the SE | Consumer 113 -> master SEI TSM 106 |
| 6 | Provision mobile payment product (MPP) | Payment processor 203 (e.g., MasterCard) establishes connection to consumers 113 and offers mobile products for download | master SEI TSM 106-> MC MOTAPS -> Consumer 113 |
| 7 | Non MC Service | Consumer 113 subscribes non MC services to a 3$^{rd}$ Party TSM 114 | Consumers 113 -> 3$^{rd}$ Party TSM |
| 8 | Request for Provisioning | 3$^{rd}$ Party TSM 114 requests either Authorized or Delegated Management (AM or DM) from the master SEI TSM 106 | 3$^{rd}$ Party TSM 114 -> MC SEI TSM 106 |
| 9 | Provide rights for Provisioning | The master SEI TSM 106 provides the appropriate keys to the 3$^{rd}$ Party TSM 106 for service provisioning into an SE | master SEI TSM 106-> 3$^{rd}$ Party TSM 106 |
| 10 | Service Provision | 3$^{rd}$ Party TSM 114 provisions service to the SE | 3$^{rd}$ party TSM 114 -> Consumer 113 |

As illustrated in FIG. 1 and shown in Table 1, the steps of exemplary method 100 for provisioning multiple virtual SEs can be carried out as described below. The data flows within FIG. 1 are depicted as directional arrows such that flows of information like keys, service offerings, applications, mobile payment products, CSNs, and services from a sending entity or actor to a receiving entity are shown with the data flow arrows pointing to the receiving entity.

More or fewer entities/actors and process steps can be adopted in alternative embodiments of method 100. Also, steps 1-10 do not have to be performed in the order shown.

In step 1, Key Generation is performed. In an embodiment, this step comprises generating a CASD Key for and SE supplier (e.g., NXP in the example of FIG. 1) and forwarding the CASD key from the master SEI TSM 106 to the SE supplier 108. As shown in FIG. 1, in one embodiment, the master SEI TSM 106 is a service offered by a payment processor 203, such as MasterCard.

In step 2, hardware SE Manufacturing is performed. During this step the CASD is created (i.e., by the SE supplier 108) and the CASD key from step 1 is injected by the SE supplier 108 into the hardware SE. As part of step, 2, the CSN is generated and the CPLC Key is delivered by mobile handset makers 110 to the SE supplier 108.

In step 3, mobile handset manufacturing is performed for mobile devices 104. In this step, the IMEI data object/number is added to the CSN and the CPLC data and sent from the Handset Maker 110 to the SE supplier 108.

In step 4, the mobile devices 104 are transferred (e.g., sold) and managed by the master SEI TSM 106. In this step, an issuer security domain (ISD) Key is added to the data sent by Handset Maker 110 to the Master SEI TSM 106 and the SE supplier 108 forwards this to the SEI TSM 106.

In step 5, SE activation occurs. In this step, in response to detecting that a use or consumer 113 first uses the mobile device 104, a software application that is either already installed on the device 104 or is to be downloaded from an Appstore (e.g., a MasterCard app store offering a MasterCard application) will retrieve the CSN, CPLC and the IMEI. This retrieved data will be sent to the Master SEI TSM 106 for verification and activation of the virtual SE. This step comprises data being sent by the software application from the mobile device 104 of the user/consumer 113 to the master SEI TSM 106.

In step 6, the MPP is provisioned. In this step a payment processor 203 (e.g., MasterCard) establishes a connection to users/consumers 113 and offers mobile payment products (MPPs) for download (i.e., to the user's 113 mobile devices 104). This entails a data from the master SEI TSM 106 to a MOTAPS platform (i.e., the MasterCard MOTAPS) to the consumer 113.

In step 7, non-MasterCard or 3$^{rd}$ party services are offered to consumers 113, who can subscribe to such non-MC services via a 3rd Party TSM 114.

In step 8, a Request for Provisioning is sent. In this step a 3rd Party TSM 114 requests either Authorized or Delegated Management (AM or DM) from the master SEI TSM 106.

In step 9, rights are provided for Provisioning. In this step the master SEI TSM 106 provides the appropriate keys to the 3rd Party TSM 106 for service provisioning into a virtual SE.

In step 10, service provisioning is performed. In this step, a 3rd Party TSM 114 provisions a service to the virtual SE on a mobile device 104 associated with a user/consumer 113 and the method 100 ends.

By repeating some or all of steps 1-10, one or more products (including MPPs) can be provisioned to a plurality of virtual SEs on a mobile device 104 having one hardware SE.

II. SYSTEM EMBODIMENT

FIG. 2 is a block diagram of an exemplary system 200 for provisioning multiple virtual SEs to a mobile device with a single SE. In an embodiment, one or more payment accounts to be used for electronic payments are mapped to or associated with the virtual SEs. As implemented in the presently described exemplary embodiment, the system 200 depicted in FIG. 2 includes a consumer payment account, a mobile device 104 comprising a mobile wallet application 201, a master SEI TSM 106, a point of sale (POS) terminal 281, a payment processor 203 (e.g., MasterCard) with a payment processing network 270 (e.g., MasterCard's Worldwide Network) that facilitates routing of mobile payment transactions for authorization, a transaction acquirer 266, and an issuer 280. As will be appreciated by those skilled in the relevant art(s), while the exemplary POS terminal 281 is depicted as a MasterCard PayPass® terminal, other contactless POS terminals 281 with NFC capabilities can be used.

Exemplary phone-based electronic wallets that can be used to implement a mobile wallet application 201 capable of providing authenticated transactions across multiple channels of commerce are described in U.S. application Ser. No. 13/209,312, entitled "Multi-Commerce Channel Wallet for Authenticated Transactions," filed on Aug. 12, 2011, which claims the benefit of U.S. Provisional Application Ser. No. 61/372,955 filed Aug. 12, 2010 and U.S. Provisional Application Ser. No. 61/468,847 filed Mar. 29, 2011, the disclosures of which are hereby incorporated by reference in their entireties.

Although the master SEI TSM 106 is depicted in FIG. 2 as being hosted by the payment processor 203, it is to be understood that in alternative embodiments, the master SEI TSM 106 can be hosted by the issuer 280 or a third party such as transaction processors or others not otherwise involved with financial transactions particularly in embodiments where the virtual SEs are used for purposes other than use of payment cards. For example, it should be understood that the master SEI TSM 106 can alternatively be external to the payment processor 203. By way of example and not limitation, in one embodiment, the master SEI TSM 106 can reside on a computing device associated with the issuer 280. Examples of third party transaction processors that may host the master SEI TSM 106, but are not limited to, outsourced transaction processors such as PrePaid Services (PPS), ElectraCard Services (ECS), First Data Resources (FDR), and providers of mobile wallet applications such as the MasterCard wallet.

Although the payment processing network 270 is depicted in FIG. 2 as being external to the payment processor 203, it is to be understood that in alternative embodiments, payment processing network 270 can be hosted by the payment processor 203.

The system 200 allows a user 113 to use nearly any mobile computing device 104 to make purchases with a payment account, including, but not limited to, a Personal Digital Assistant (PDA), a tablet computing device, an iPhone™, an iPod™, an iPad™, a device operating the Android operating system (OS) from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to make electronic purchases using a payment account (e.g., credit card).

With reference to FIG. 2, the payment processor 203, provide various services and product offerings to support customers and vendors. In one embodiment, the payment processor 203 can use the MasterCard Internet Service, which includes the InControl™ product offering. Examples of such product offerings are described in U.S. Pat. No. 6,315,193; U.S. Pat. No. 6,793,131; U.S. application Ser. No. 10/914,766, filed on Aug. 9, 2004; U.S. application Ser. No. 11/560,112, filed on Nov. 15, 2006; U.S. application Ser. No. 12/219,952, filed on Jul. 30, 2008; and International Application No. PCT/US2009/005029, filed on Sep. 19, 2009, U.S. Published Patent Applicaton No. 2009/0037333, filed on Jul. 30, 2008, all incorporated herein by reference in their entireties (herein the controlled payment numbers or CPN Patents).

The communication links depicted in the system 200 between the various components can be through public and/or private networks or virtual private networks (e.g., the Internet and mobile networks particularly with respect to communications with mobile device 104, and private networks such as payment processing network 270).

As shown in FIG. 2, a selection of a payment account is received at the POS terminal 281 when a transaction is initiated by a user 113 with a mobile device 104. According to this embodiment, the mobile device 104 comprises a mobile wallet application 201 that has previously been provisioned. In accordance with an embodiment, the mobile wallet application 201 will have at least one primary account number (PAN) and can access at least one virtual SE previously provisioned to the hardware SE chip embedded in the mobile device 104. A payment account associated with a PAN can also access the virtual SE as needed for payment processing.

After a user 113 selects one of their pre-registered payment accounts using the mobile device 104, an authorization request 268 is submitted with the mobile account credentials and the PAN to an acquirer 266, usually via a merchant (i.e., a merchant associated with POS terminal 281). The mobile device 104 in system 200 might have multiple virtual SEs provisioned to it, so the user 113 can select, using the mobile wallet application 201, one of a plurality of payment accounts associated with respective virtual SEs. That is, each virtual SE in the hardware SE may be associated with only one or a plurality of PANs, depending on implementation.

The acquirer 266 then routes authorization request 268 to a payment processing network 270 associated with the payment processor 203 (e.g., MasterCard).

After receiving the authorization request 268, payment processing network 270 makes a service call 274 to the payment processor 203, which does verification. In accordance with exemplary embodiments, this verification can be accomplished using a mobile PIN (MPIN), an Authorization Request Cryptogram (ARQC), and/or CVC3. The payment processor 203 also communicates with the master SEI TSM 106 as needed to perform service management for the payment processor 203 for services being used by the user 113 of the mobile device 104. After verification and communication with the master SEI TSM 106 is completed, the payment processor 203 generates a response 278 to the service call 274 and forwards the response 278 to the payment processing network 270.

Based on information contained in the authorization request 268, the payment processor 203 verifies the user 113 and maps the payment transaction to a payment account. In one embodiment, the payment account can be a real card account (RCA) for a credit card. As the mobile device 104 depicted in FIG. 2 has multiple virtual SEs, the user 113 can use the mobile wallet application 201 to select one of a plurality of payment accounts associated with an associated virtual SE. The payment processor 203 then routes the payment account details to the issuer 280 and the issuer 280 responds to the authorization request 268 with the authorization response 272.

After receiving the service call response 278, the payment processing network 270 routes authorization information to the acquirer 266, which in turn uses the authorization information to generate an authorization response 272. This authorization response 272 can be based on controls in place for the selection payment account and information the issuer 280 has regarding the payment account (i.e., spending/credit limits).

After generating the authorization response 272, the acquirer 280 routes the authorization response 272 back to the POS terminal 281.

In one embodiment, the mobile wallet application 201 can also be configured to synchronize payment account information between multiple payment accounts in multiple virtual SEs on the mobile device 104 and payment processor 203 in response to detecting deletions, additions, or modifications to the one or more payment accounts.

In other embodiments described below with reference to FIGS. 3 and 4, a global TSM hub within a global TSM environment handles communications between a plurality of service offerors (SOs), service providers (SPs), third party TSMs 114, handset makers 110, SE suppliers 108, and users 113 associated with mobile devices 104 having multiple virtual SEs.

III. GLOBAL TRUSTED SERVICE MANAGER (GLOBAL TSM) AND HUB

Figure 3:
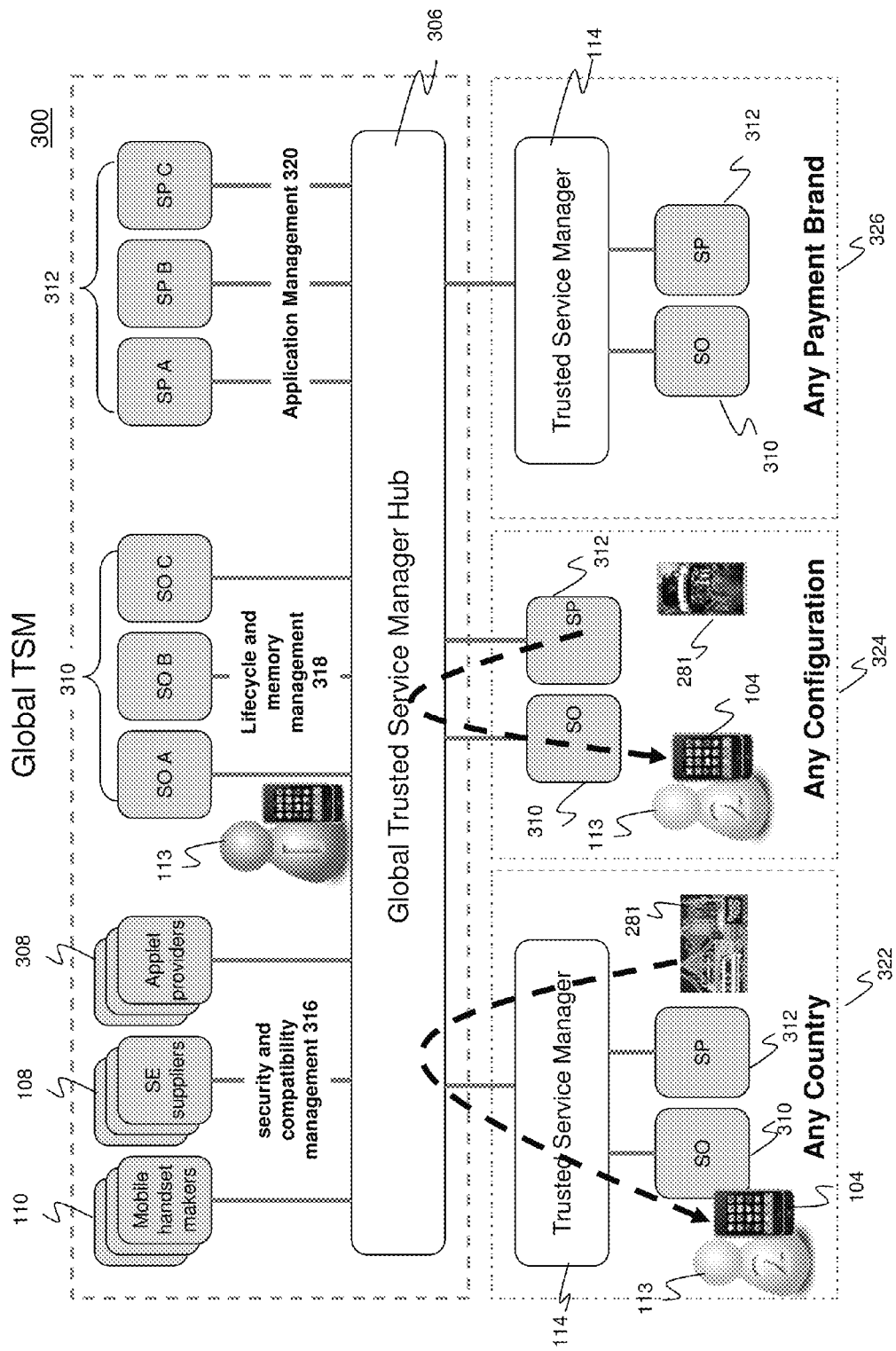
FIG. 3 illustrates an implementation of a global trusted service manager (global TSM) using a global trusted service manager hub (global TSM hub), in accordance with an exemplary embodiment of the present disclosure.
Figure 4:
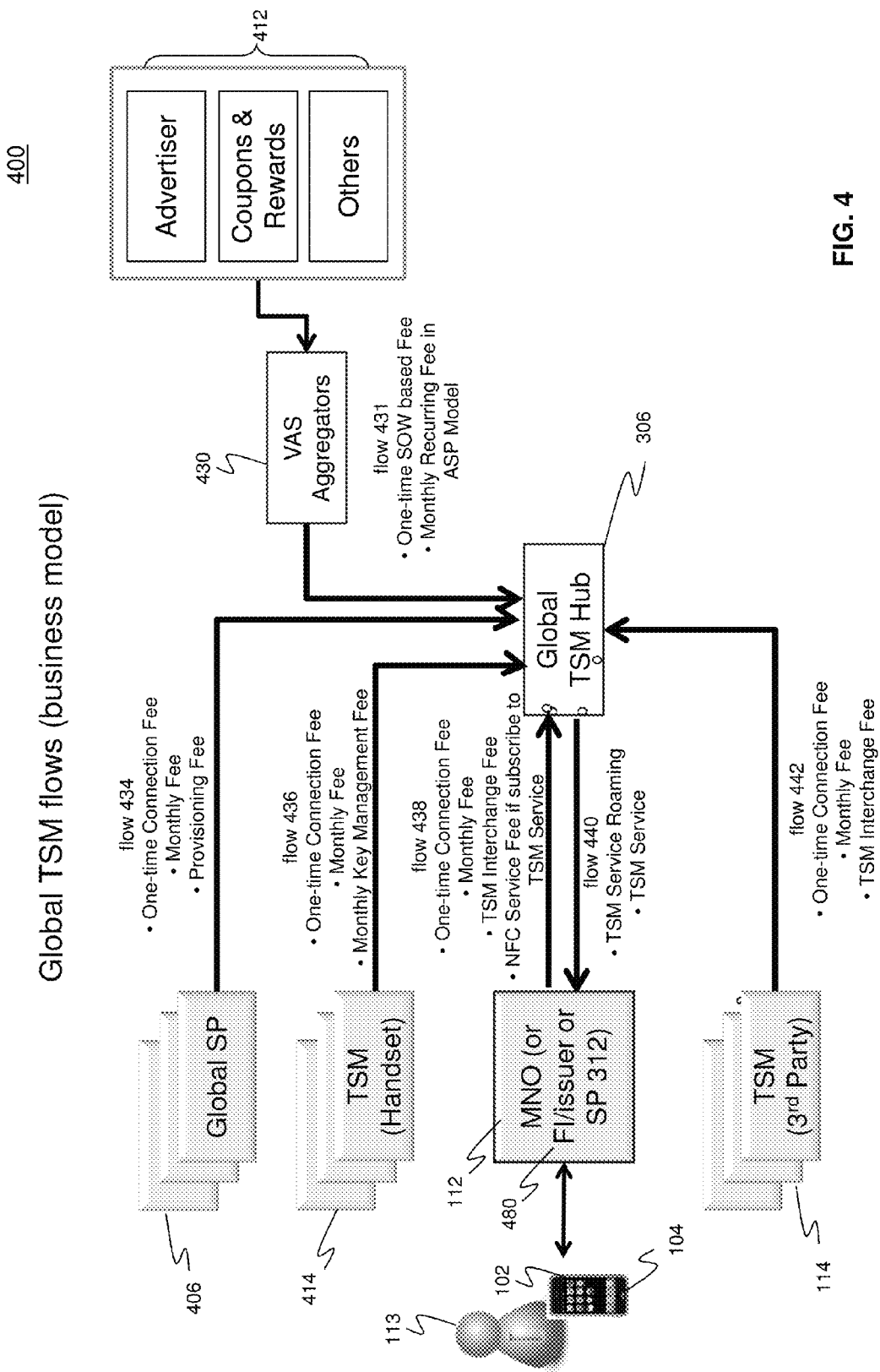
FIG. 4 is block diagram depicting interaction and information flows between parties using a global TSM and global TSM hub, in accordance with an exemplary embodiment of the present disclosure.

FIGS. 3 and 4 illustrate the functionality of a Global trusted service manager (Global TSM) and Global TSM Hub. FIGS. 3 and 4 are described with continued reference to the embodiments illustrated in FIGS. 1 and 2. However, FIGS. 3 and 4 are not limited to those embodiments.

FIG. 3 illustrates an implementation 300 of a global trusted service manager (global TSM) using a global trusted service manager hub (global TSM hub 306.

As shown in FIG. 3, the global TSM hub 306 can acts a liaison or broker to exchange keys and information between mobile handset makers 110, SE suppliers 108, applet providers 303, service offerors 310, service providers 312, and users 113 associated with mobile handsets/devices 104.

FIG. 3 shows how the global TSM environment using the global TSM hub 306 can support TSMs 114 to enable mobile payments at POS terminals 281 using virtual SEs from mobile devices 104 in multiple countries or local markets 322, with varied configurations 324 and using a variety of payment brands 326.

With continued reference to FIG. 3, as the name implies, the global TSM hub 306 can act as hub to receive and forward communications needed to provide other services such as a Post Issuance Management Services (PIMS), account management (e.g., PAN management/mapping and prepaid processing), key management services (e.g. CVC3 validation), applet upgrade/patch services, software version upgrade/patch services, and mobile device GUI 102 administration. These are but a few of the services depicted in FIG. 3 as security and compatibility management services 316, lifecycle and memory management services 318, and application management services 320. Flows for each of these categories of services are described below.

In the exemplary embodiment of FIG. 3, mobile handset makers 110, SE suppliers 108 and applet providers 303 communicate, via the global TSM hub 306 with a TSM 114 as needed to offer security and compatibility management services 316 for mobile devices 104. For example, security and compatibility management services 316 will be offered by a particular mobile handset maker 110 to users 113 associated with a mobile device 104 made/manufactured by that mobile handset maker 110. Also, for example, a particular SE supplier 108 can offer security and compatibility management services 316 to users 113 associated with a mobile device 104 having an embedded SE chip manufactured, issued, or supplied by that particular SE supplier 108. Similarly, an applet provider 308 can offer security and compatibility management services 316 to users 113 associated with a mobile device 104 having an applet from that particular applet provider 308 installed on them. One example of such applet security and compatibility management services 316 is a prompt within an applet executing on a mobile device 104 to install a security upgrade, new applet version, or patch/bug fix for an applet. Such prompts can be displayed, for example on the GUI 102 of the mobile device 104.

In the exemplary embodiment of FIG. 3, mobile handset makers 110, SE suppliers 108 and applet providers 303 communicate, via the global TSM hub 306 with a TSM 114 as needed to offer security and compatibility management services 316 for mobile devices 104. For example, security and compatibility management services 316 will be offered by a particular mobile handset maker 110 to users 113 associated with a mobile device 104 made/manufactured by that mobile handset maker 110. Also, for example, a particular SE supplier 108 can offer security and compatibility management services 316 to users 113 associated with a mobile device 104 having an embedded SE chip manufactured, issued, or supplied by that particular SE supplier 108. Similarly, an applet provider 308 can offer security and compatibility management services 316 to users 113 associated with a mobile device 104 having an applet from that particular applet provider 308 installed on them. One example of such applet security and compatibility management services 316 is a prompt within an applet executing on a mobile device 104 to install a security upgrade, new applet version, or patch/bug fix for an applet. Such prompts can be displayed, for example on the GUI 102 of the mobile device 104.

With continued reference to FIG. 3, service offerors 310 (see, e.g., SO A, SO B and SO C) communicate, via the global TSM hub 306 with a TSM 114 as needed to offer lifecycle and memory management services 318 for mobile devices 104. As shown in FIG. 3, information for lifecycle and memory management services 318 can be communicated from SO A, SO B, or SO C (collectively, service offerors 310) via the global TMS hub 306 to an appropriate TSM, such as a $3^{rd}$ party TSM 114 that handles services for a given service offeror 310 (i.e., SO A, SO B, or SO C). From that point, the $3^{rd}$ party TSM 114 can then route service-related communications to a target mobile device 104 that has a virtual SE for the given service offered by the service offeror 310 already provisioned to its hardware SE. The users 113 of these target mobile devices 104 are subscribers to the lifecycle and memory management services 318 and these services are managed by SO A, SO B, and SO C. Examples of lifecycle and memory management services 318 include, but are not limited to, services for memory allocation associated with services offered by SO A, SO B or SO C, and services to handle upgrades to the services during the service lifecycles (i.e., service updates, upgrades, and patches/fixes).

As also shown in FIG. 3, service providers 312 (see, e.g., SP A, SP B and SP C) communicate, via the global TSM hub 306 with a TSM 114 as needed to offer application management services 320 for mobile devices 104. As illustrated in FIG. 3, information for application management services 320 can be communicated from SP A, SP B, or SP C (service providers 312) via the global TMS hub 306 to an appropriate TSM, such as a $3^{rd}$ party TSM 114 that handles services for a given service provider 312 (i.e., SP A, SP B, or SP C). From that point, the $3^{rd}$ party TSM 114 can then route service-related communications to a target mobile device 104 that has a virtual SE for the given service provided by the service provider 312 previously provisioned to its hardware SE. The users 113 of these target mobile devices 104 are subscribers to the application management services 320 and these services are managed by SP A, SP B, and SP C. Examples of application management services 320 include, but are not limited to, services for managing the provisioning of software applications that are associated with services offered by SP A, SP B, or SP C, and are installed on a target mobile device 104. These application management services 320 can further include services for verifying, activating, and updating the software applications.

As further depicted in FIG. 3, the global TSM hub 306 can also route communications from POS terminal 281s to a mobile device 104 via a $3^{rd}$ party TSM 114 (see, e.g., country-related configuration 322). As shown in FIG. 3, for country-related configuration 322, a $3^{rd}$ party TSMs 114 associated with a particular country or market can in turn have connections to service offerors 310 (e.g., SO) and service providers 312 (e.g. SP) that are likewise associated with that market or country.

FIG. 3 also shows that a variety of configurations 324 can be supported by using the global TSM hub 306 to route communications needed for an NFC payment initiated at POS terminal 281 to a mobile device 104 without using a $3^{rd}$ party TSM 114 and instead directly communicating with a service provider 312 (SP in configuration 324) and an service offeror (SO in configuration 324).

Lastly, FIG. 3 shows an embodiment where a variety of payment brands 326 can be supported by a $3^{rd}$ party TSM 114 connected to the global TSM hub 306 and a service provider 312 (SP as part of payment brand 326) and an service offeror (SO as part of payment brand 326).

FIG. 4 is block diagram depicting interaction and information flows (including fees) between parties using a global TSM and global TSM hub 306 as part of a global TSM business model 400.

As shown in FIG. 4, a global service provider (SP) 406 and send the fees shown in via data flow 434 to the global TSM hub 306. For example, flow 434 can include one or more of a One-time Connection Fee, a Monthly Fee, and a Provisioning Fee.

Value added service (VAS) providers 412, a type of service provider 312, can send the fees shown in via the flow 431 from a VAS aggregator 430 to the global TSM hub 306. For example, flow 431 can include one or more of a One-time SOW based Fee and a Monthly Recurring Fee in an application service provider (ASP) Model.

As shown in FIG. 4, in embodiments, the VAS providers 412 can include advertisers, coupon and reward providers, and other value added service providers that need to forward data and fee information to the global TSM hub 306. Non-limiting examples of VAS providers 412 include 'daily deal' providers and merchants registered as participants in one or more loyalty programs.

In one embodiment, VAS providers 412 are daily deal providers. Such daily deal providers, in conjunction with offer distributors, use new media and mobile-enabled social networking applications and websites to convey offers for special deals and discounts. Once a user 113 accepts an offer, payment information for that offer is exchanged, but no payment is actually made. Non-limiting examples of daily deal providers include Groupon, Google Offers, Amazon, BuyWithMe, LivingSocial, HTC Corporation, and Dealon, to name a few daily deal providers and offer distributors. The daily deal providers and offer distributors listed above and other players who are VAS providers 412 have services, applications, and processes that users 113 provision, install and follow so that they can be notified of offers and 'daily deals.' These VAS providers 412 have processes for consumers 113 to follow in order to avail themselves of offers. Many of the processes and approaches also require access to an SE, and in the context of the present disclosure, a virtual SE, for offer redemption and payment. Example methods and systems for using a financial transaction card (e.g., credit, debit, pre-paid card, virtual, hybrid or nearly any other types of payment cards used for transacting business) number system as an integral part of an offer distribution, verification and redemption system are described in U.S. application Ser. No. 13/455,951, entitled "Methods and Systems for Offer and Dynamic Gift Verification and Redemption," filed on Apr. 25, 2012, which is incorporated herein by reference in its entirety.

In another embodiment, VAS providers 412 are merchants registered as participants in one or more loyalty programs can administer their own loyalty program and offer value added services to users 113 who are members of that loyalty program. For example, grocery stores, pharmacies, and other merchants can establish and run their own loyalty programs. In another embodiment, merchants can register to participate in other, external loyalty programs where those programs are from service offerors 310 and service providers 312 external to the merchant. For example, credit card issuers 280, restaurants, car rental companies, and lodging merchants can register to participate in one or more airline frequent flyer loyalty programs so that their customers 113 receive points, miles or other credits towards rewards based upon completed purchase transactions (i.e., monies spent using an 'affinity' payment account/credit card account tied to the loyalty program or payments for meals, car rentals, hotel stays and associated services) using a virtual SE provisioned for a payment account tied to that loyalty program. Example methods and systems for tying payment accounts used for electronic payments to loyalty programs are described in U.S. application Ser. No. 13/415,207, entitled "Systems and Methods for Attaching Loyalty Program Data to an Electronic Payment Scheme," filed on Mar. 8, 2012, which is incorporated herein by reference in its entirety.

Users 113 associated with mobile devices 104 having virtual SEs can use their mobile devices 104 to receive and accept loyalty program discounts and coupons offered by merchants. In this embodiment, a merchant (and the loyalty program) can act as a $3^{rd}$ party service offeror 310 with participation in the loyalty program and any accompanying software being the service. Thus, a $3^{rd}$ party TSM 114 can be set up for the merchant and/or loyalty program, and by provisioning software offered by the merchant/loyalty program, a user 113 can grant access to a virtual SE in the hardware SE of his/her mobile device 104 that has been provisioned for use with the merchant/loyalty program.

A TSM for a handset 414 can use flow 436 to send the fees shown in FIG. 4 to the global TSM hub 306. For example, flow 436 can include one or more of a Model One-time Connection Fee, a Monthly Fee, and a Monthly Key Management Fee.

An MNO 112, or issuer/financial institution 480, or service provider 312 can use flows 438 to send the indicated fees and flow 440 to receive TSM service roaming and TSM services to and from the global TSM hub 306. For example, flow 438 can include one or more of a One-time Connection Fee, a Monthly Fee, a TSM Interchange Fee, and an NFC Service Fee if there is a subscription to a TSM Service.

As shown in FIG. 4, the MNO 112, issuer 480 or service provider 312 can also communicate with the mobile device 104, and by extension, the user 113 associated with that device.

Lastly, a third party TSM 114 can use flow 442 to send the fees shown in FIG. 4 to the global TSM hub 306. For example, flow 442 can include one or more of a One-time Connection Fee, a Monthly Fee, and a TSM Interchange Fee.

IV. EXAMPLE USER INTERFACE

Figure 5:
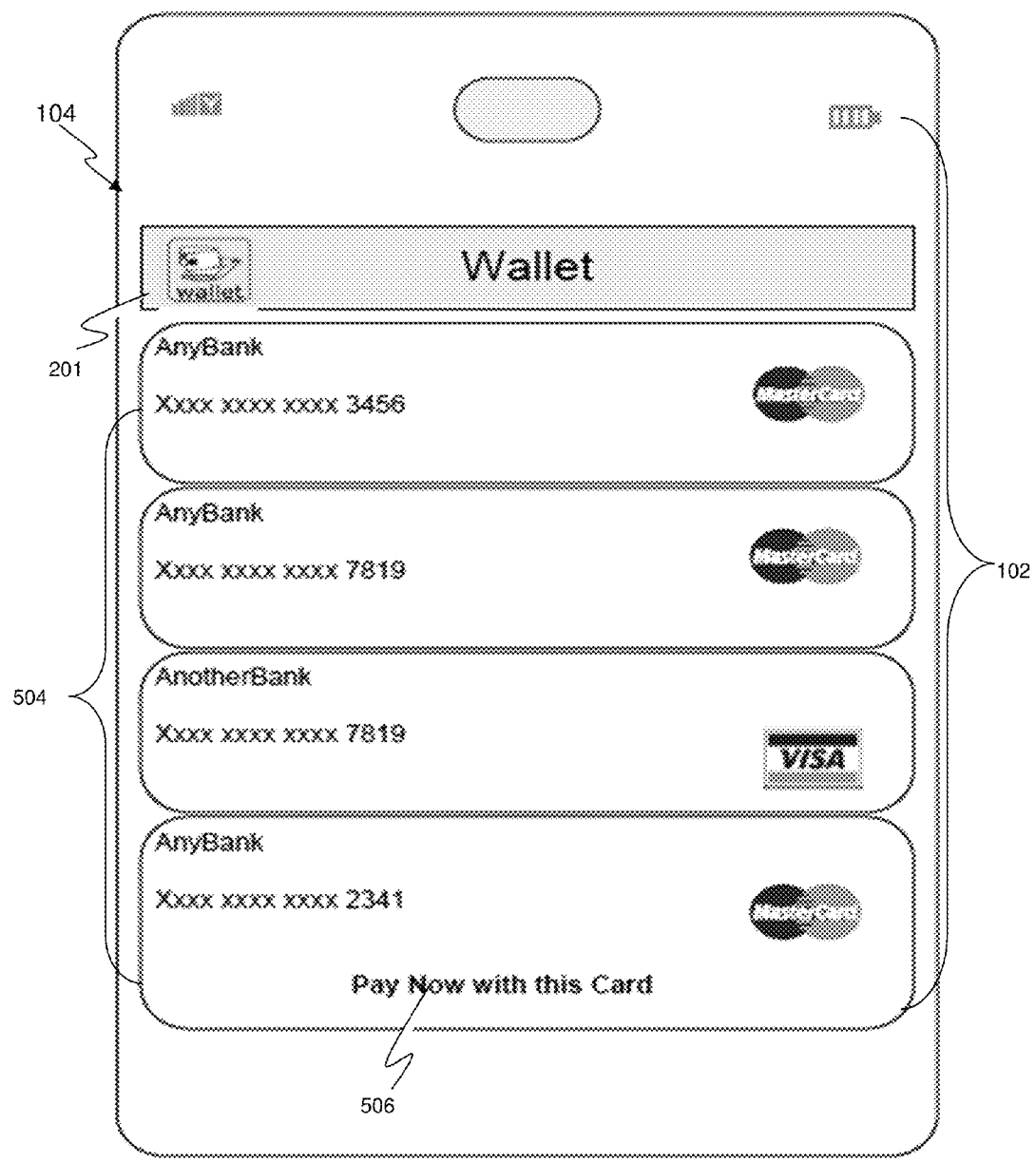
FIG. 5 illustrates an exemplary graphical user interface (GUI) for viewing and selecting a payment account from amongst a plurality of payment accounts on a mobile device with multiple virtual SEs, in accordance with an exemplary embodiment of the present disclosure.

FIG. 5 depicts an example graphical user interface (GUI) for displaying information stored in multiple virtual SEs regarding multiple payment accounts. FIG. 5 is described with continued reference to the embodiments illustrated in FIGS. 1-4. However, FIG. 5 is not limited to those embodiments.

In an embodiment, a mobile wallet application 201 may include the exemplary interface 102 illustrated in FIG. 5. According to this embodiment, a mobile device 104 running the mobile wallet application 201 may display the exemplary interface illustrated in FIG. 5 within GUI 102. In FIG. 5, a display is shown with various hyperlinks, command regions, tabs, buttons, checkboxes, and data entry fields, which are used to initiate action, invoke routines, enter data, view data, or invoke other functionality, such as functionality of the mobile wallet application 201.

FIG. 5 illustrates an exemplary GUI 102 for viewing and selecting a payment account from amongst a plurality of card images 504. As shown in FIG. 5, card images 504 can correspond to one or more real card accounts (RCAs). Through interaction with the GUI 102, a user 113 can add or remove one or more payment accounts.

By using an input device (not shown) or touch screen on mobile device 104, the user 113 can user the GUI 102 to associate a payment account (i.e., a card or an RCA) with transaction account and for dynamic selection of a payment account for a payment transaction.

By selecting one of the card images 504, the GUI 102 allows the user 113 to visually select which payment account to use for payment from the wallet application 201. In the exemplary embodiments of FIG. 5, the GUI generates a prompt 506 so that the user 113 can confirm selection of a payment account. The GUI 102 can also be used to receive payment confirmation at the mobile device 104.

In an embodiment, each of the card images 504 and corresponding mobile accounts can retrieve data, including encrypted data, stored in one of a plurality of virtual SEs previously provisioned to the mobile device 104. In an embodiment, such provisioning can be accomplished by executing the steps of method 100 described above with reference to FIG. 1.

V. EXAMPLE COMPUTER SYSTEM IMPLEMENTATION

As would be appreciated by someone skilled in the relevant art(s) and described below with reference to FIG. 6, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on mobile device 104, POS terminal 281, payment processor 203, transaction acquirer 266, issuer 280, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor.

Aspects of the present disclosure shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
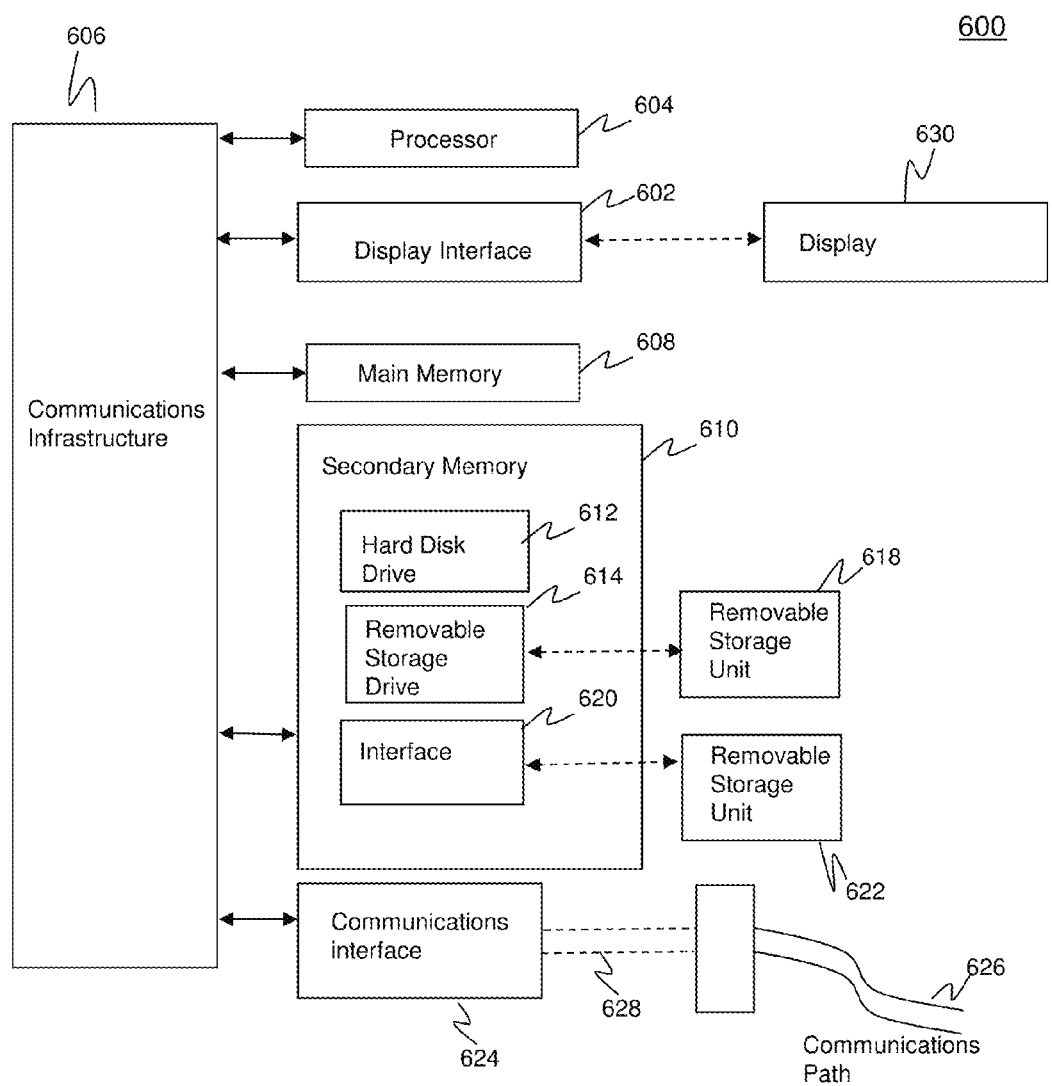
FIG. 6 depicts an example computer system in which embodiments of the present invention may be implemented.

FIG. 6 illustrates an example computer system 600 in which embodiments of the present disclosure, or portions thereof, may be implemented as computer-readable code. For example, method 100 and system 200 of FIGS. 1 and 2, global TSM 300 and global TSM hub 306 FIGS. 3 and 4, and graphical user interface (GUI) 102 depicted in FIG. 5 can be implemented in computer system 600 using hardware, software, firmware, non-transitory computer readable media having instructions stored thereon, or a combination thereof and may be implemented in one or more computer systems or other processing systems. Hardware, software, or any combination of such may embody any of the modules and components used to implement the system, and user interface of FIGS. 2 and 5. Similarly, hardware, software, or any combination of such may embody modules and components used to implement method steps and data flows of FIGS. 1, 3 and 4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like.

The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a non-transitory computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular/wireless phone link, an RF link or other communications channels.

In this document, the terms "computer program medium," "non-transitory computer readable medium," and "computer usable medium" are used to generally refer to tangible media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present disclosure as discussed herein. In particular, the computer programs, when executed, enable processor device 604 to implement the processes of the present disclosure, such as the enumerated steps/stages in the method illustrated by FIG. 1, discussed above. Accordingly, such computer programs represent controllers of the computer system 600. Where the present disclosure is implemented using software, the software may be stored in a computer program product and loaded into computer system 600 using removable storage drive 614, interface 620, and hard disk drive 612, or communications interface 624.

Embodiments of the present disclosure also may be directed to computer program products comprising software stored on any computer useable medium. Such software, when executed in one or more data processing device, causes a data processing device(s) to operate as described herein. Embodiments of the present disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

VI. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of providing a virtual secure element (virtual SE) to a mobile device having a secure element chip (SE), the method comprising:
   generating, by a master secure element issuer trusted service manager (master SEI TSM), for the virtual SE, a key for a certificate authority security domain (CASD key) for transmission to an SE supplier;
   forwarding, by the master SEI TSM, to the SE supplier, the CASD key, generated by the master SEI TSM, for a certificate authority security domain (CASD) previously created by the SE supplier,
   wherein the forwarded CASD key causes the SE supplier to provide a card serial number (CSN) and a card production life cycle key (CPLC key) to a maker of the mobile device;
   receiving, by the master SEI TSM, from the maker of the mobile device, via the SE suppler, an updated CSN and CPLC data including an International Mobile Equipment Identity (IMEI) for the mobile device, where an issuer security domain key (ISD key) is added to the updated CSN and CPLC data;
   detecting, by the master SEI TSM, a first use of the mobile device;
   in response to detecting the first use of the mobile device, provisioning, by the master SEI TSM, a software application to the mobile device, wherein the software application, downloaded on the mobile device, is configured to:
   retrieve the CSN, the CPLC data, and the IMEI; and
   send the CSN, the CPLC data, and the IMEI to the master SEI TSM; and
   based at least in part on the CSN, the CPLC data, and the IMEI, received from the software application downloaded on the mobile device, verifying and activating, by the master SEI TSM, the virtual SE.

2. The method of claim 1, further comprising providing a plurality of virtual secure elements (virtual SEs) by:
   generating a CASD key, for each of the plurality of virtual SEs, for an SE supplier that previously created a corresponding certificate authority security domain (CASD); and
   forwarding a CASD key for each of the plurality of virtual SEs to the SE supplier that created the corresponding CASD.

3. The method of claim 1, wherein the SE supplier is an SE chip manufacturer, SE chip supplier, or SE chip provider.

4. The method of claim 1, wherein upon receiving the forwarded CASD key, the SE supplier injects the CASD key into the virtual SE.

5. The method of claim 1, wherein the CPLC key is a 42 byte key provided by the SE supplier.

6. The method of claim 1, wherein SE supplier is the same entity as the maker of the mobile device.

7. The method of claim 1, further comprising:
   prompting, by the master SEI TSM, a user associated with the mobile device to download one or more products or service offerings comprising at least a mobile payment product (MPP); and
   in response to receiving a request from the mobile device to download at least one product or service offering, provisioning the MPP and software associated with the at least one product or service offering from the SET TSM to the mobile device.

8. The method of claim 1, further comprising:
   prompting, by a third party trusted service manager (TSM), a user associated with the mobile device to download one or more products or service offerings offered by the third party; and
   in response to receiving a request from the mobile device to download at least one third party product or service offering:
      provisioning software associated with the at least one third party product or service offering from the third party to the mobile device; and
      subscribing the user associated with the mobile device to the third party TSM.

9. The method of claim 8, further comprising:
   receiving, from the third party, a TSM request at the master SEI TSM for delegated management (DM).

10. The method of claim 8, further comprising:
    receiving, from the third party, a TSM request at the master SEI TSM for authorized management (AM).

11. The method of claim 8, further comprising:
    providing, by the master SEI TSM, appropriate keys to the third party TSM for provisioning a third party service into the SE; and
    provisioning the third party service into the SE.

12. The method of claim 1, wherein the SE contains a cardlet in ROM.

13. The method of claim 12, wherein the cardlet is a mobile PayPass® cardlet.

14. The method of claim 1 wherein the SE supplier injects the CASD key into the SE during manufacturing of the SE.

15. A non-transitory computer readable storage medium having program instructions stored thereon for providing a plurality of virtual secure elements (virtual SEs) to a mobile device having a secure element chip (SE), executable on a computing device, the instructions, when executed, causes the computing device to:
    generate, for each of the plurality of virtual SEs, a key for certificate authority security domain (CASD key) for transmission to an SE supplier of the SE that previously created a corresponding certificate authority security domain (CASD);
    forward a CASD key, generated by the computing device, for each of the plurality of virtual SEs to the SE supplier that created the corresponding CASD for causing the card serial number (CSN) and a card production life cycle key (CPLC key) from the SE supplier to be forwarded to a maker of the mobile device;
    receive, from the maker of the mobile device, an updated CSN and CPLC data including International Mobile Equipment Identity (IMEI) data;
    add an issuer security domain key (ISD key) to the updated CSN and CPLC data;
    detect a first use of the mobile device;
    provision a software application to the mobile device in response to detecting the first use of the mobile device, wherein the software application, downloaded on the mobile device, is configured to:
    retrieve the CSN, the CPLC data, and the IMEI; and
    send the CSN, the CPLC data, and the IMEI to the master SEI TSM; and
    instructions for verifying and activating at least one of the plurality of virtual SEs based at least in part on the CSN, the CPLC data, and the IMEI, received from the software application downloaded on the mobile device, and a CASD key for the at least one of the plurality of virtual SEs previously forwarded to the SE supplier.

* * * * *